United States Patent [19]
Adams

[11] 3,758,055
[45] Sept. 11, 1973

[54] RELEASE MECHANISM FOR FLARE PARACHUTE

[75] Inventor: Gary V. Adams, Perry, Utah

[73] Assignee: Thiokol Chemical Corporation, Bristol, Pa.

[22] Filed: Feb. 17, 1972

[21] Appl. No.: 223,145

[52] U.S. Cl. ............ 244/149, 244/151 B, 24/230 R
[51] Int. Cl. ............................................ B64d 17/38
[58] Field of Search ............ 244/149, 151 R, 151 B, 244/152; 24/230 R, 230 AU, 211 R

[56] References Cited
UNITED STATES PATENTS

| | | | |
|---|---|---|---|
| 2,502,097 | 3/1950 | Linder | 244/151 B |
| 3,153,395 | 10/1964 | Karp | 244/151 B |
| 3,433,436 | 3/1969 | Mattey | 24/230 R X |

*Primary Examiner*—Milton Buchler
*Assistant Examiner*—Carl A. Rutledge
*Attorney*—Edward E. McCullough

[57] ABSTRACT

A mechanism for releasing a drogue parachute from an aerial flare has a base plate with a central lug extending therefrom that has means for attaching a drogue parachute at its outer end, and an intermediate zone of reduced diameter; the lug extends centrally through a disk to which a pair of opposing pawls are attached for a sliding movement thereon; spring means bias the disk away from the base plate so that the pawls, which are spring biased toward each other, normally abut the central lug at its larger diameter. Hence, the pawls are normally extended beyond the diameters of the base plate and the disk to fit beneath the shoulder in a flare case, whereby the mechanism may be retained therein. Means are also provided for limiting the space between the base plate and the disk, and a shear pin that extends radially from the lug adjacent the disk may be used to insure that the pawls are normally maintained in their extended positions by abutting the larger diameter of the central lug.

6 Claims, 3 Drawing Figures

PATENTED SEP 1 1 1973　　3,758,055

RELEASE MECHANISM FOR FLARE PARACHUTE

CROSS-REFERENCE TO RELATED APPLICATIONS

This application is somewhat related to three other applications owned by the same assignee: "Release Mechanism for Flare Parachute" by Roger A. Grosgebauer, filed Feb. 3, 1972, Ser. No. 223,159; "Aerial Flare With Drogue Parachute" by J. R. Thurston, filed June 11, 1971, Ser. No. 152,204, now U.S. Pat. No. 3,719,146; and "Aerial Flare and Parachute Deployment Therefore" by W. F. Davis et al., filed Dec. 26, 1968, Ser. No. 787,079, now U.S. Pat. 3,380,251.

BACKGROUND OF THE INVENTION

This invention relates to mechanisms for releasing parachutes from aerial flares. Particularly, it relates to mechanisms for releasing drogue parachutes from flares deployed by high speed aircraft. The invention described herein was made during the course of or under a contract with the U.S. Air Force.

When flares are deployed from aircraft traveling at speeds of the order of 650 knots per hour, two undesirable results commonly occur. First, the flare develops a rapid spin that tends to stop or slow down timing mechanisms for deployment of the main parachute. Second, the velocities of deployment plus the spin are great enough to destroy the main parachute if it were to be deployed without some means of slowing these velocities. As described in the second application cited above, a drogue parachute has been found effective in slowing the flare for safe deployment of the main parachute. Although the invention cited in that application was effective for this purpose, it has been found desirable to separate the drogue parachute completely from the flare after it has served its prupose, so that it cannot fall back and interfere with the function of the main parachute.

SUMMARY OF THE INVENTION

The present invention, which fills this need, is a force-actuated release mechanism that is operated by the drogue parachute itself. A base plate has a central lug extending from it that is attachable at one end to a drogue parachute and has an intermediate zone of reduced diameter. This lug extends through a central hole on a disk to which a pair of diametrically opposing pawls are attached for radial, sliding movement. Spring means maintains a space between the base plate and the disk. A cup shaped housing encloses the base plate and is tightly confined against the disk by a pair of screws, each of which passes through aligned holes in the housing, the base plate, the disk, and also through slotted holes in the pawls. The pawls are spring biased toward each other and normally abut the lug 11 at its larger diameter, whereby the pawls are locked beneath a shoulder of the flare case. The central lug is equipped with a dashpot that, together with the compression springs, attenuate the shock produced by the opening of the drogue parachute on the mechanism. When this occurs, the lug is pulled forceably toward the parachute, compressing the compression springs and withdrawing the enlarged diameter of the lug from between the pawls but replacing it with the enlarged diameter thereof on the other side of the reduced diameter zone before the pawls can enter that zone. Then as the flare is decelerated to a predetermined terminal velocity, the compression springs overcome the opposing force exerted by the drogue parachute and draw the reduced diameter zone of the lug between the pawls. This releases the pawls from beneath the shoulder of the inside of the flare case so that the entire mechanism together with the drogue parachute is automatically released from the flare.

Objects of the invention are to provide a mechanism that will attenuate the shock and force exerted on an aerial flare deployed at high speed when the drogue parachute thereof is suddenly opened. Another object of the invention is to provide such a mechanism that will automatically release the drogue parachute from such a flare after it has performed its function of slowing the flare to a predetermined terminal velocity. Important features of the invention are its structural simplicity, reliability, and simplicity of manufacture.

Other objects and features of the invention will become apparent as the following detailed description is read with reference to the accompanying drawings, wherein the same parts are designated by the same numerals through the disclosure.

DESCRIPTION OF THE PREFERRED EMBODIMENTS

Figure 1:
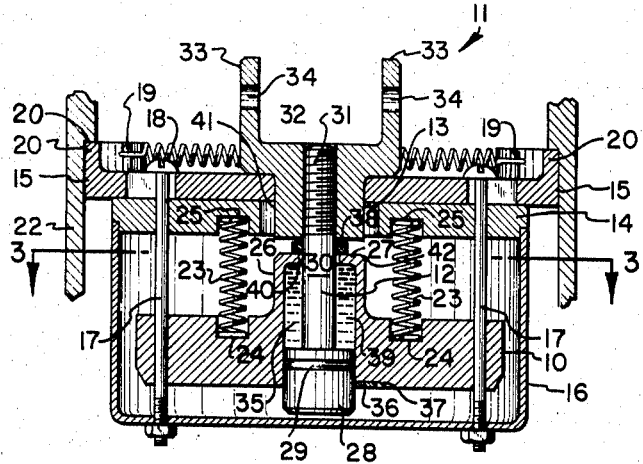
FIG. 1 is a longitudinal section of the invention.
Figure 2:
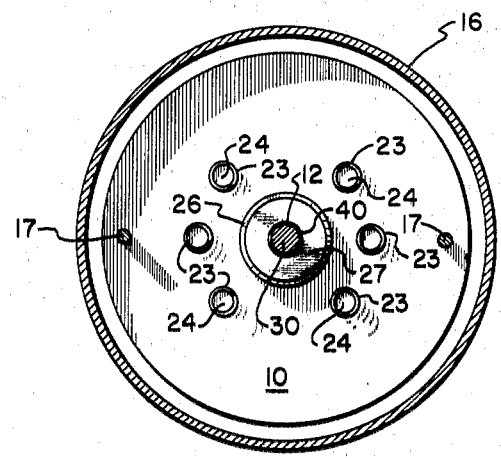
FIG. 2 is a top view of the invention.
Figure 3:
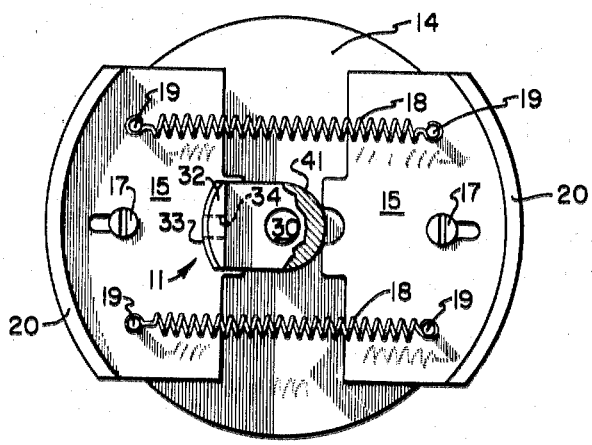
FIG. 3 is a cross-section taken on line 3—3 of FIG. 1.

A base plate 10 has a central lug 11 that is fixed perpendicular to the base plate at one end and is attachable at its other end to a drogue parachute, not shown. An intermediate zone 12 of the lug 11 is of reduced diameter. The lug 11 extends through a hole 13 in a disk 14 on which diametrically opposed pawls 15 are slideably attached. A cup shaped housing 16 encloses the base plate 10 and is positioned with its edges tightly against the disk 14, by a pair of nut equipped screws 17, each of which passes through aligned holes in the housing 16, the base plate 10, the disk 14, and a slotted hole in one of the pawls 15. The screws 17 thus serve a triple purpose of: (1) maintaining the housing 16 in a fixed position; (2) limiting the space between the base plate 10 and the disk 14; and (3) providing means for slideably attaching the pawls 15 to the disk 14. The pawls 15 are biased toward each other by a pair of tension springs 18, each of which is attached at one end to a lug 19 and at its other end to a similar lug on the opposite pawl. The outer end portions of the pawls 15 are arcuate in form and are equipped with flanges 20 that fit under a shoulder 21 in the flare case 22 (see FIG. 1). FIG. 1 of each of the cited, related applications shows the type of flare to which the invention may apply. A plurality of compression springs 23 are used to space the base plate 10 and the disk 14 apart from each other, each spring being seated in a recess 24 in the base plate at one end and in an aligned recess 25 in the disk.

Although the central lug 11, as described above, could function at lower speeds in the preferred embodiment of the invention, this lug is a fairly complex structure. A central boss 26 extends perpendicular to the base plate 10 and is counterbored to form an inwardly extending, annular flange 27. A piston 28 having a seal 29 is attached to a shaft 30 that is threaded on its outer end portion 31. A bifurcated lug member 32 has the same diameter as the boss 26 and is internally threaded to receive the threaded end 31 of the shaft 30. The bifurcations 33 of the lug member 32 are equipped with holes 34 to which a drogue parachute, not shown, may be attached. A dashpot chamber 35 is formed in the boss 26 between the flange 27 and the piston 28. A shear pin 36 extends radially from the piston 28 into a small recess 37 in the base plate 10. An O-ring seal 38 seated in an annular recess near the threaded end 31 of the shaft 30 is normally tightly confined against the end of the boss 26 by the bifurcated lug member 32 to seal viscous, silicone fluid 39 into the hydraulic chamber.

When a flare equipped with the invention is dropped from an aircraft, a static line is normally attached at one end to a cap on the flare and at the other end to the aircraft. The cap is jerked free of the flare, automatically releasing the drogue parachute. Since the flare is normally traveling at velocities near the speed of sound, the drogue parachute opens and exerts considerable shock and force on the central lug 11 that would normally destroy the parachute and damage the flare. However, when the flare is equipped with this invention, the following sequence of events occurs: (1) the shear pin 36 is sheared off; (2) the compression springs 23 are compressed and the hydraulic fluid 39 is squeezed through the precision, annular orifice 40 between the flange 27 of the boss 26 and the shaft 30, these springs and dashpot cooperating to form an attenuation device for absorbing the initial shock of the drogue parachute opening; then (3) as the velocity of the flare decelerates to a predetermined terminal velocity, the compression springs 23 overcome the opposing force exerted by the drogue parachute and withdraw the boss 26 from between the pawls 15, so that they may slip into the reduced diameter zone of the lug 11 formed by the shaft 30. This last event withdraws the pawls 15 from the shoulder 21 of the flare case to release the entire device and the drogue parachute from the flare.

When not in actual use, the compression springs 23 and the shear pin 36 cooperate to maintain the cylindrical portion of the bifurcated lug member 32 between the pawls 15 so that the flanges 20 thereof are locked beneath the shoulder 21 of the flare case. Force is exerted so suddenly by the drogue parachute on the lug 11 that, although the cylindrical portion 41 is withdrawn from between the pawls 15, it is immediately replaced by the boss 26 before the tension springs 18 can move the pawls 15 into the reduced diameter zone 12 of the lug 11. This action is promoted by the facts that the reduced diameter zone 12 is only slightly longer than the thickness of the disk 14 and that the boss 26 is beveled at 42.

An invention has been described that constitutes an advance in the art of deploying aerial flares from high speed aircraft. Although a preferred embodiment of the invention has been described with considerable specificity regarding details, it should be noted that such details may be altered without departing from the scope of the invention as it is defined in the following claims.

The invention claimed is:

1. Apparatus for releasing a drogue parachute from an aerial flare having a tubular case with a shoulder therein, comprising:
   a base plate having recesses therein;
   a lug centrally fixed to the base plate and extending perpendicular thereto, the lug having means for attaching a drogue parachute and an intermediate zone of reduced diameter;
   a disk having a central hole through which the lug extends and recesses opposing those of the base plate;
   a pair of diametrically opposing pawls the inner ends of which abut the central lug and the outer ends which are arcuate and equipped with flanges and extend beyond the diameters of the base plate and disk when the pawls abut the larger diameter of the central lug, in which position they may be locked in place below the shoulder in the flare case for attaching the drogue parachute thereto;
   spring means attaching the pawls together and biasing them toward the central lug;
   means for attaching the pawls to the disk for radial sliding motion thereon;
   springs seated in the recesses for biasing the base plate and the disk away from each other; and
   means for limiting the space between the base plate and the disk.

2. The apparatus of claim 1 wherein the means for attaching the pawls to the disks and the means for limiting the space between the base plate and the disk are a pair of screws, each extending through aligned holes in the base plate and disk and through a slot in the corresponding pawl.

3. The apparatus of claim 2 further including a cup shaped housing member, the annular edge of which fits against the disk and is fixed in that position by the screws that are extended through holes therein.

4. The apparatus of claim 1 wherein the spring means biasing the pawls toward each other is a pair of tension springs, each fastened at one end to a lug on one of the pawls and at its other end to a lug on the opposite pawl.

5. The apparatus of claim 1 wherein the central lug comprises:
   a dashpot comprising a cylindrical boss extending from the center of the base plate and having a counterbore that extends through the base plate and forms an inwardly-extending, annular flange defining a central orifice at the end of the boss; a piston seated in the counterbore; and a shaft fixed to the piston, extending through the orifice, and equipped at its outer end with threads, a dashpot chamber for hydraulic fluid being formed between the piston and the annular flange of the boss; and
   a cylindrical lug member, having substantially the same diameter as that of the boss, threadedly engaged to the shaft, the lug member having means for attaching a drogue parachute thereto.

6. The apparatus of claim 5 further including a shear pin fixed in the central piston and extending radially therefrom adjacent the disk, whereby it may be sheared off by a sudden shock force on the central lug.

* * * * *